US010633055B2

(12) United States Patent
Brulais et al.

(10) Patent No.: US 10,633,055 B2
(45) Date of Patent: Apr. 28, 2020

(54) METHOD AND A SYSTEM FOR ESTIMATION OF A USEFUL EFFORT PROVIDED BY AN INDIVIDUAL DURING A PHYSICAL ACTIVITY CONSISTING IN EXECUTING AN ALTERNATING PEDALLING MOVEMENT ON A PEDAL DEVICE

(71) Applicant: COMMISSARIAT A L'ENERGIE ATOMIQUE ET AUX ENERGIES ALTERNATIVES, Paris (FR)

(72) Inventors: Sébastien Brulais, Saint Martin d'Hères (FR); Leandro Cassarino, Grenoble (FR); Jean-Philippe Gros, Le Fontanil Cornillon (FR); Andréa Vassilev, Fontaine (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 168 days.

(21) Appl. No.: 15/593,622

(22) Filed: May 12, 2017

(65) Prior Publication Data

US 2017/0334513 A1 Nov. 23, 2017

(30) Foreign Application Priority Data

May 17, 2016 (FR) ...................................... 16 54366

(51) Int. Cl.
*B62M 6/50* (2010.01)
*A63B 24/00* (2006.01)
(Continued)

(52) U.S. Cl.
CPC ............ *B62M 6/50* (2013.01); *A63B 24/0062* (2013.01); *B62M 6/15* (2013.01); *B62M 6/90* (2013.01);
(Continued)

(58) Field of Classification Search
CPC .. B62M 6/50; B62M 6/15; B62M 6/90; A63B 24/0062; A63B 2024/0065;
(Continued)

(56) References Cited

U.S. PATENT DOCUMENTS

| 4,423,630 A | * | 1/1984 | Morrison | ............... | A61B 5/221 |
| | | | | | 340/323 R |
| 7,599,806 B2 | * | 10/2009 | Hauschildt | ............. | A61B 5/221 |
| | | | | | 702/44 |

(Continued)

FOREIGN PATENT DOCUMENTS

| EP | 2 860 096 A1 | 4/2015 |
| JP | 11-147494 A | 6/1999 |
| WO | 2012/038677 A1 | 3/2012 |

OTHER PUBLICATIONS

Spagnol et al., "Pedaling Torque Reconstruction for Half Pedaling Sensor", 2013 European Control Conference (ECC), Jul. 17-19, 2013, pp. 275-280; cited in the French Search Report.

(Continued)

Primary Examiner — Jacob D Knutson
(74) Attorney, Agent, or Firm — Seckel IP, PLLC

(57) ABSTRACT

The method involves a step of measurement of a bearing force ($Fp_n$) on a pedal (1) of the pedal set (4), different from the useful effort, exerted by the individual during a pedalling cycle, a step of determination of a maximum ($max(Fp_n)$) of the bearing force measured during the pedalling cycle ($CP_j$), and a step of estimation of a mean useful effort exerted by the individual during said pedalling cycle from the maximum of the bearing force determined and with the aid of a predetermined correlation function between a maximum bearing force during a pedalling cycle and a mean useful effort in said cycle.

24 Claims, 5 Drawing Sheets

(51) Int. Cl.
  *B62M 6/15* (2010.01)
  *B62M 6/90* (2010.01)
  *G01L 3/24* (2006.01)

(52) U.S. Cl.
  CPC .............. *G01L 3/242* (2013.01); *G01L 3/245* (2013.01); *A63B 2024/0065* (2013.01); *A63B 2220/51* (2013.01); *A63B 2220/56* (2013.01); *A63B 2230/75* (2013.01); *A63B 2244/00* (2013.01)

(58) Field of Classification Search
  CPC ............ A63B 2220/51; A63B 2220/56; A63B 2230/75; A63B 2244/00; G01L 3/242; G01L 3/245
  USPC ...................................................... 180/205.3
  See application file for complete search history.

(56) References Cited

U.S. PATENT DOCUMENTS

| | | | |
|---|---|---|---|
| 2007/0245835 A1 | 10/2007 | Hauschildt | |
| 2010/0263468 A1* | 10/2010 | Fisher | B62M 3/00 74/469 |
| 2012/0173167 A1* | 7/2012 | Lukatela | B62M 3/16 702/42 |
| 2012/0247853 A1* | 10/2012 | Hashimoto | B62M 6/45 180/206.3 |
| 2013/0054143 A1* | 2/2013 | DeGolier | G01L 1/247 702/3 |
| 2013/0197744 A1* | 8/2013 | Tuulari | H04L 67/125 701/34.4 |
| 2014/0297070 A1* | 10/2014 | Gros | B62M 6/50 701/22 |
| 2015/0253210 A1 | 9/2015 | Ashby et al. | |
| 2016/0009340 A1 | 1/2016 | Lin | |
| 2016/0023081 A1* | 1/2016 | Popa-Simil | A63B 69/16 700/91 |
| 2016/0041051 A1* | 2/2016 | Smit | A63B 22/0605 700/91 |

OTHER PUBLICATIONS

French Search Report and Written Opinion dated Jan. 9, 2017 issued in counterpart application No. FR1654366; w/English partial translation and partial machine translation (18 pages).

European Office Action dated Feb. 19, 2020 in counterpart application No. 17171415.7; with English machine translation (total 15 pages) (D1-D7 cited in the European Office Action are not listed in this IDS since they were already listed in the IDS filed May 12, 2017).

* cited by examiner

METHOD AND A SYSTEM FOR ESTIMATION OF A USEFUL EFFORT PROVIDED BY AN INDIVIDUAL DURING A PHYSICAL ACTIVITY CONSISTING IN EXECUTING AN ALTERNATING PEDALLING MOVEMENT ON A PEDAL DEVICE

This application claims priority of French application No. FR1654366 filed May 17, 2016, which is hereby incorporated by reference herein in its entirety.

TECHNICAL FIELD OF THE INVENTION

The invention concerns a method and a device for estimation of a useful effort provided by an individual during a physical activity consisting in executing an alternating pedalling movement on a pedal device. It also concerns a method and a system for estimating the useful power developed by the individual during the pedalling.

PRIOR ART

During pedalling, the cyclist executes with their legs an alternating pedalling movement on the bicycle, which generates an alternating rotation movement of two cranks, operated by the pedals, about an axis.

In order to better manage their effort, it is useful for the cyclist to know the useful power which they are providing during the pedalling. This information can likewise serve to better manage the pedalling assistance of an electrically assisted bicycle outfitted with an electric or thermal motor, to monitor the changes in the effort of the cyclist, or to calculate the overall energy provided by the cyclist.

The useful power developed by the cyclist at a time t can be calculated by the following relation:

$$P_u(t) = F_u(t) \times L_m \times \dot{\theta}(t)$$

where $P_u(t)$ represents the useful power at the time t;

$F_u(t)$ represents the useful or effective force (or effort) exerted by the cyclist to drive the pedal set in rotation at the time t;

$L_m$ represents the length of the cranks of the pedal set;

$\dot{\theta}(t)$ represents the angular velocity of the pedal set at the time t.

The useful or effective force $F_u(t)$ corresponds to the orthogonal component of the force transmitted to one or the other of the cranks by bearing on the pedals, in other words, the force orthogonal to the longitudinal axis of the crank. This force is likewise known as tangential force due to the fact that it is tangential to the circular trajectory of the crank.

One known solution for calculating the useful power developed by a cyclist is described in the document WO2012/038677. This solution is based on measurements of the bearing force exerted by the cyclist on one of the pedals and the angular position of the crank operated by that pedal. A calculator determines the useful or effective force Mt), orthogonal to the crank, from the measured bearing force and the measured angular position, with the aid of a predetermined model for the distribution of the effort exerted on the pedal as a function of the angular position. A pressure sensor arranged in or on the pedal measures the bearing force exerted on the pedal by the cyclist. The angular position is measured either indirectly, with the aid of an accelerometer placed on the pedal set or in the pedal, or directly from an angular sensor comprising for example an encoder wheel. These measurements of angular position also make it possible to calculate the angular velocity $\dot{\theta}(t)$ of the pedal set.

However, this solution has certain drawbacks. In particular, it requires either the use of a costly angular sensor, or the estimating of the angular position from measurements of the acceleration, which requires substantial power resources for the calculator and might be lacking in precision.

The present invention aims to improve the situation so as to estimate the useful effort exerted by an individual during a physical activity consisting in executing an alternating movement, in a more simple and more economical manner.

Purpose of the Invention

Accordingly, the invention concerns a method of estimation of a useful effort, in particular of an average useful effort on a pedalling cycle, provided by an individual during a physical activity consisting in executing an alternating pedalling movement on a pedal device, involving a step of measurement of a bearing force on a pedal of the pedal set, different from the useful effort, exerted by the individual during the pedalling cycle, characterized in that it involves a step of determination of a maximum of the bearing force measured during the pedalling cycle, and a step of estimation of a mean useful effort exerted by the individual during said pedalling cycle from the maximum of the bearing force determined and with the aid of a predetermined correlation function between a maximum bearing force during a pedalling cycle and a mean useful effort in said cycle.

Thanks to the invention, the useful effort or the average useful effort on the cycle, provided by the individual or cyclist is estimated in simple manner, directly from simple measurements of the bearing force on at least one of the pedals. The estimation does not require angle measurements or major calculations.

Advantageously, the predetermined function is an affine linear regression function.

In one particular embodiment, the bearing force is measured with the aid of a pressure sensor outfitting at least one of the pedals of the pedal set.

Advantageously, the useful effort estimated or the average useful effort on the cycle, is the tangential component of a force transmitted to the crank by bearing on the pedal or the estimation of the mean on the cycle of the tangential component of a force transmitted to the cranks by bearing on the pedals.

Again advantageously, the bearing force measured is the component of a total bearing force exerted by the individual on the pedal which is orthogonal to a plane of bearing on the pedal.

In one particular embodiment, during a preliminary calibration step, one determines the correlation function from a set of measurements of said bearing force and measurements of the corresponding useful effort, in particular measurements of the average useful effort on the corresponding cycle.

The invention also concerns a method of estimation of a useful power, in particular of an average useful power over a pedalling cycle, developed by an individual during a physical activity consisting in executing an alternating pedalling movement on a pedal device, characterized in that it involves an estimation of the mean useful effort exerted by the individual during the current pedalling cycle, by implementing the method defined above, a step of measuring an acceleration of the pedal set during a succession of pedalling cycles, a step of determination of a pedalling rhythm valid for the current pedalling cycle from the measurements of acceleration, and a step of calculating the mean useful power developed during the current pedalling cycle from the mean useful effort estimated for said current pedalling cycle and the estimated pedalling rhythm valid for said current pedalling cycle.

Advantageously, during the step of calculating the useful power, in particular of the average useful power developed during the pedalling cycle, one calculates the product of the mean useful effort estimated during the current pedalling cycle, a current angular velocity and the length of a crank of the pedal set, said angular velocity being a function of the estimated pedalling rhythm (N) valid for the current pedalling cycle.

Again advantageously, the method of estimation involves a test step consisting in checking to see is the estimated pedalling rhythm is between 0.5 Hz and 2 Hz and in that the calculating of the mean useful power during the pedalling cycle is inhibited in the event of a negative test.

Again advantageously, the method of estimation involves a test step designed to detect variations in the acceleration from a value equal to or close to +1 g to a value equal to or close to −1 g and from a value equal to or close to −1 g to a value equal to or close to +1 g, and in that the calculating of the mean useful power for the current pedalling cycle is inhibited in event of a positive test.

The method of estimation may likewise involve a test step designed to detect whether the measured acceleration is contained in a predefined template and in the event of a negative test the calculating of the mean useful power for the current pedalling cycle is inhibited.

The invention also concerns a use of the method of estimation of a useful power, in particular of the average useful power developed during a pedalling cycle, developed by an individual during a physical activity consisting in executing an alternating pedalling movement on a pedal device, as just defined, in order to estimate an amount of calories spent by the individual during the physical activity, involving a step of integrating over time the estimated power in order to calculate an estimation of the energy spent and a step of conversion of the estimated energy spent into calories.

The invention further concerns a device for estimation of a useful effort, in particular an average useful effort, provided by an individual during a physical activity consisting in executing an alternating pedalling movement on a pedal device, comprising a sensor to measure a bearing force on a pedal of the pedal set, different from the useful effort, exerted by the individual during a pedalling cycle, characterized in that it comprises a module for determination of a maximum of the bearing force measured during a current pedalling cycle, and an estimator of useful effort designed to estimate a mean useful effort exerted by the individual during said current pedalling cycle from the maximum of the bearing force determined and with the aid of a predetermined correlation function between a maximum of the bearing force exerted during a pedalling cycle and a mean useful effort in said pedalling cycle.

The device advantageously comprises all or some of the following additional characteristics:
  the bearing force is measured with the aid of a pressure sensor outfitting at least one of the pedals of the pedal set;
  the device comprises a memory for storing an affine linear regression function, constituting the correlation function.

The invention also concerns a system for estimation of a useful power developed, in particular of the average useful power developed during a pedalling cycle, by an individual during a physical activity consisting in executing an alternating pedalling movement on a pedal device, characterized in that it comprises
  a device for estimation of the mean useful effort exerted by the individual during a pedalling cycle, as previously defined,
  a sensor to measure an acceleration of the pedal set during a succession of pedalling cycles,
  a module for determination of a pedalling rhythm valid for a current pedalling cycle, from the measurements of acceleration, and
  a calculator of useful power designed to calculate the mean useful power developed during a pedalling cycle, from the mean useful effort estimated for said pedalling cycle and from the valid pedalling rhythm determined for said pedalling cycle.

The system advantageously comprises all or some of the following additional characteristics:
  the sensor to measure an acceleration is disposed in or on one pedal of the pedal set;
  the system comprises a control unit, integrating the estimator of useful effort and the calculator of useful power, adapted to communicate by wireless link with the force sensor and with the acceleration sensor outfitting one pedal of the pedal set;
  the calculator of useful power is adapted to calculate the product of the mean useful effort estimated for a pedalling cycle, an angular velocity of the pedal set valid for said pedalling cycle and the length of a crank of the pedal set, said angular velocity being a function of the pedalling rhythm determined;
  the system comprises a first test module consisting in checking to see if the estimated pedalling rhythm is between 0.5 Hz and 2 Hz, the power calculator being adapted to inhibit the calculating of the useful power in event of a negative test;
  the system comprises a second test module designed to detect variations in the acceleration between a value equal to or close to +1 g and a value equal to or close to −1 g, the power calculator being adapted to inhibit the calculating of the useful power in event of a positive test;
  the system comprises a third test module designed to detect whether the measured acceleration is contained in a predefined template, the power calculator being adapted to inhibit the calculating of the useful power in event of a negative test.

The invention also concerns an electrically assisted bicycle, comprising an electric motor, a power supply battery, and a motor control device, characterized in that it comprises a system for estimation of a useful power developed by an individual during the pedalling on said bicycle, as just defined, the control device being adapted to control the electric motor as a function of the estimated useful power.

The invention also concerns a motorization kit for a bicycle, comprising an electric or thermal motor, a power supply battery, and a motor control device, characterized in that it comprises a system for estimation of a useful power developed by an individual during the pedalling on said bicycle, as previously defined, the control device being adapted to control the motor as a function of the estimated useful power.

SUMMARY DESCRIPTION OF THE DRAWINGS

The invention will be better understood with the aid of the following description of a particular embodiment of the method and the device for estimation of the useful effort provided by a cyclist in the course of pedalling, as well as of the method and the system for estimation of the useful power developed by the cyclist in the course of pedalling, according to the invention, making reference to the appended drawings, in which.

DETAILED DESCRIPTION OF PARTICULAR EMBODIMENTS OF THE INVENTION

The invention aims to estimate the useful or effective effort (or force) provided by an individual, or cyclist, during a physical activity consisting in executing an alternating pedalling movement on a pedal device 4. It also aims to estimate the useful power developed by the individual during the pedalling.

Figure 1:
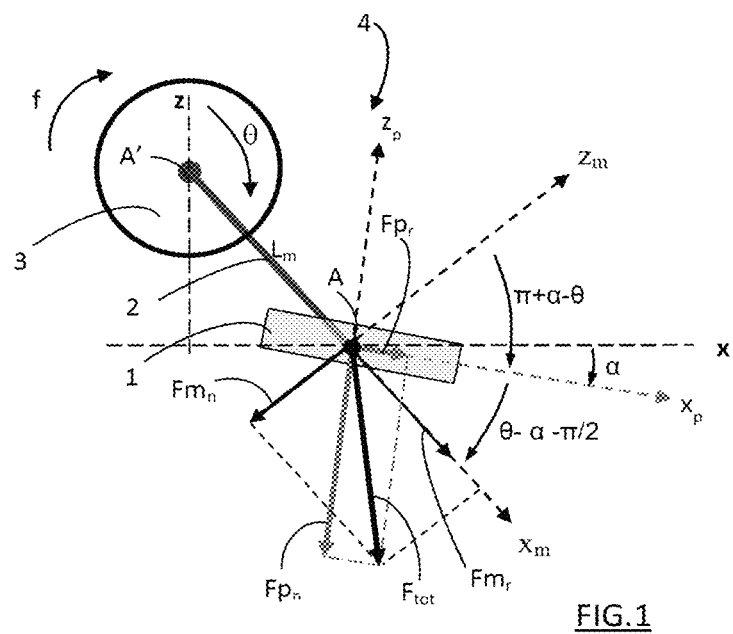
FIG. 1 represents a schematic side view of a bicycle pedal set, as well as the forces exerted by a cyclist on the pedal set.
Figure 2:
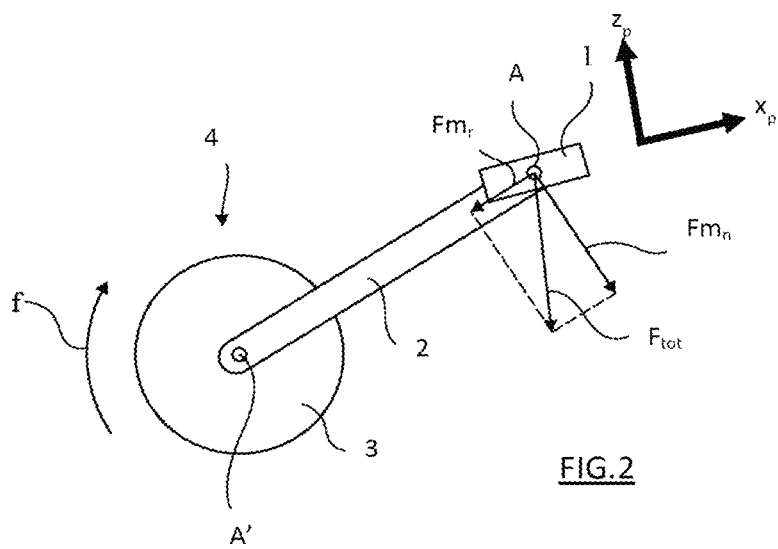
FIG. 2 represents another side view of the bicycle pedal set of FIG. 1, with the forces transmitted to a crank of the pedal set when the cyclist bears on the pedal.

In the exemplary embodiment described here, the pedal set 4 outfits a bicycle (or bike). Referring to FIGS. 1 and 2, the pedal set 4 comprises, as is known, two pedals 1, two cranks 2 and a transmission plate 3. The pedals 1 are mounted so as to turn about an axis of rotation A, each of them at one of the ends of one of the cranks 2. The other end of the crank 2 is connected to the transmission plate 3.

During the pedalling, the cyclist executes an alternating movement of the legs by bearing on the pedals 1 with their feet. The pedal set 4 converts this alternating movement of the legs into an alternating movement of rotation of the pedal set 4, involving a rotation of the cranks 2 and the plate 3 about an axis of rotation A', in the direction shown by the arrow f in FIGS. 1 and 2. Thus, the bearing effort exerted by the cyclist on the pedals 1 is transmitted by the cranks 2 to the plate 3 which is driven in rotation.

The straight line passing through the axes of rotation A and A' in the plane of FIG. 1 or 2 defines a longitudinal axis of the crank 2.

Figure 3:
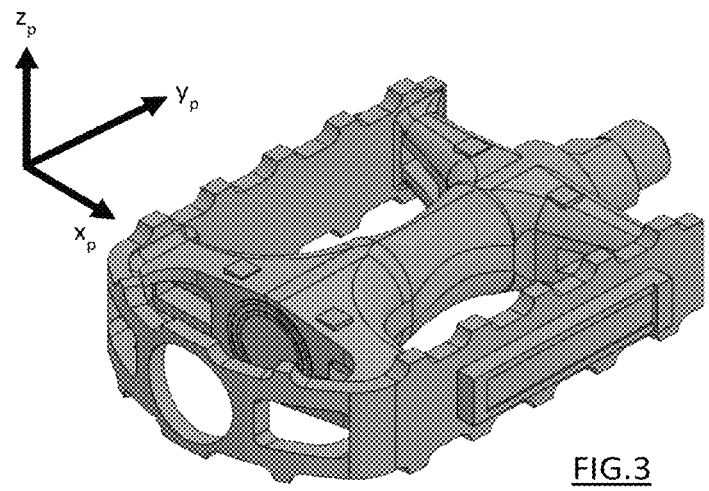
FIG. 3 represents a perspective view of a pedal with its orthonormalized reference system, according to one exemplary embodiment.

In FIG. 3 is shown one of the pedals 1, not instrumented (that is, without sensor), according to a particular exemplary embodiment, and an orthonormalized reference system ($x_p$, $y_p$, $z_p$) associated with this pedal 1. The axis of rotation A of the pedal 1 is parallel to the direction of the axis $y_p$. The pedal 1 defines a plane of bearing of the foot of the cyclist, parallel to the plane ($x_p$, $y_p$).

An orthonormalized reference system ($x_m$, $y_m$, $z_m$) is also associated with each crank 2. The axis $x_m$ extends in the direction of the longitudinal axis of the crank 2. The axis $y_m$ of the crank 2 is parallel to the axis $y_p$ of the pedal 1, these two axes $y_m$ and $y_p$ being orthogonal to the plane of FIGS. 1 and 2. The axes $x_m$ and $z_m$ of the crank 2 are offset in angle by an angle θ-α-Π/2 in relation to the axes $x_p$ and $z_p$ of the pedal 1, respectively, θ representing the angle between the vertical and the longitudinal axis (or the axis $x_m$) of the crank 2 and a representing the angle between the horizontal and the axis $x_p$ of the pedal 1.

The effort exerted by the cyclist on one or the other of the pedals 1 is represented in FIG. 1 by the force $F_{tot}$ which is the total bearing force on the pedal 1 in question. This total bearing force $F_{tot}$ exerted on the pedal 1 in question is in fact the sum of a radial force (or component) $Fp_r$, parallel to the axis $x_p$ of the pedal, and a normal force (or component) $Fp_n$, parallel to the axis $z_p$ of the pedal, as represented in FIG. 1. We note that the force $Fp_n$ is the component of the bearing force exerted on the pedal 1 which is orthogonal to the plane of bearing on the pedal 1.

The total bearing force $F_{tot}$ on the pedal 1 is transmitted to the associated crank 2. It may be broken down, in the area of the crank 2, into a radial force (or component) $Fm_r$, parallel to the axis $x_m$, and a normal force (or component) $Fm_n$, parallel to the axis $z_m$. This normal force $Fm_n$ may likewise be called the "tangential" force because it is tangential to the circular trajectory of the crank 2.

The normal force $Fm_n$ exerted on the crank is the one which has the effect of placing the pedal set 4 in movement and thus propelling the bicycle. It constitutes the useful or effective effort (or force), denoted $F_u$, to place the pedal set 4 in movement and consequently cause the bicycle to advance. In other words: $Fm_n = F_u$. This normal or tangential force $Fm_n$ is the moving force applied to the crank 2 of the pedal set 4.

The invention makes it possible to estimate the mean useful effort (or force) provided by the cyclist in a pedalling cycle, or otherwise put, in a pedalling revolution during which the cranks 2 each execute a rotation of 360°. This mean useful effort is estimated from a maximum measured value of the normal bearing force $Fp_n$, exerted on one or the other of the pedals 1 by the cyclist during the pedalling revolution or cycle, and with the aid of a predetermined correlation function. This normal bearing force $Fp_n$ applied to the pedal 1 constitutes a force allowing one to evaluate the useful force $F_u$. The invention also makes it possible to estimate the mean useful power developed by the cyclist in a pedalling revolution or cycle.

We note that if only one pedal is instrumented (that is, contains one or more sensors to measure the normal bearing force), only the maximum value of the normal bearing force on this instrumented pedal is measured during a given pedalling cycle. The mean useful effort of the cyclist is then evaluated from this maximum value of the normal bearing force on the instrumented pedal and with the aid of the correlation function.

In one variant embodiment, the two pedals are instrumented. In this case, a first maximum value of the bearing force on a first pedal and a second maximum value of the bearing force on the second pedal are measured during a pedalling cycle. Then a mean maximum value of the normal bearing force can be calculated from these two maximum values. Finally, the mean useful effort of the cyclist during this pedalling cycle is calculated from this mean maximum value calculated and with the aid of the correlation function.

In another variant, the two maximum values of the normal bearing force on the first pedal and on the second pedal are used to determine, with the aid of the correlation function, two values of the mean useful effort of the cyclist during the pedalling cycle in question. Then, an average of these two values of the mean useful effort is calculated in order to obtain the mean useful effort for the pedalling cycle.

The use of two instrumented pedals makes it possible to obtain a better precision as to the value of the mean useful effort of the cyclist in the pedalling cycle.

Figure 4:
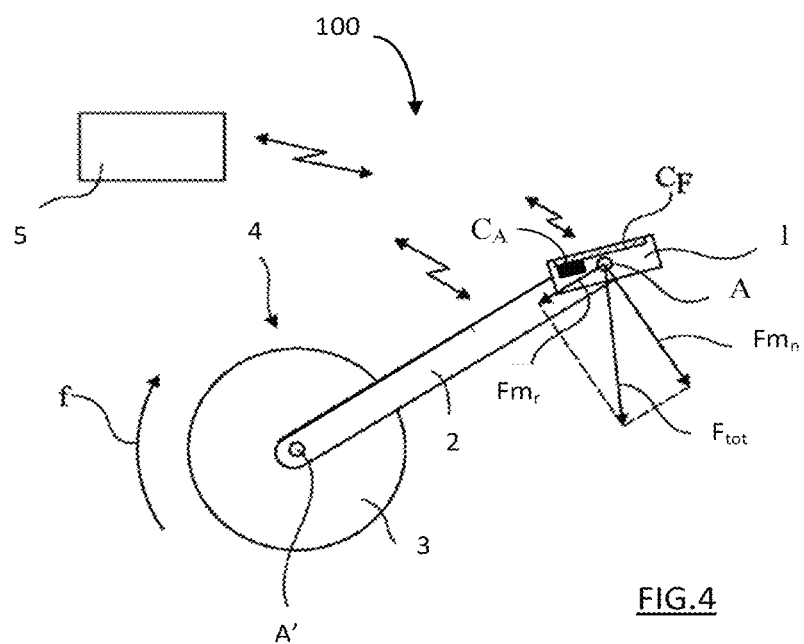
FIG. 4 represents a side view of the bicycle pedal set of FIG. 2 outfitted with a system for estimation of the useful power developed by the cyclist according to one particular embodiment of the invention.

FIG. 4 shows a system 100 for estimation of power, designed to estimate the mean useful power provided by the cyclist in a pedalling cycle. The system 100 comprises:
- a sensor $C_F$ to measure the normal bearing force $Fp_n$ exerted by the cyclist on one of the pedals 1, different from the useful effort, during a pedalling cycle or revolution;
- a sensor $C_A$ to measure the acceleration of the pedal 1 along the axis $z_p$ of the reference system associated with the pedal 1;
- a control unit 5 comprising:
  - a module 50 for determination of a maximum, or extremum, of the normal bearing force measured during a pedalling cycle, denoted max($Fp_n$);
  - a memory 51 for storing a correlation function between the mean useful effort provided by a cyclist during a pedalling cycle (or revolution), denoted $\overline{Fm_n}$, and the maximum of the normal bearing force during said cycle, denoted max($Fp_n$);
  - a module 52 for estimation of a pedalling rhythm corresponding to a number of pedalling revolutions per unit of time, from measurements of acceleration,
  - an estimator of effort 53 to estimate the mean useful effort exerted by the cyclist during a pedalling cycle, from the maximum value of the normal bearing force $Fp_n$ measured and with the aid of the stored correlation function, and
  - a power calculator 54 to calculate the mean useful power developed during a pedalling cycle from the mean useful effort estimated during this pedalling cycle and the pedalling rhythm determined.

The sensor $C_F$ is a pressure sensor arranged in or on the pedal 1. It is adapted to measure the bearing force exerted by the cyclist orthogonally to the pedal, in other words, the normal force $Fp_n$. The sensor $C_F$ may be a simple pressure sensor of the type used in a bathroom scale. One example of such a sensor is described in more detail in the document WO2012/0386677.

Figure 5:
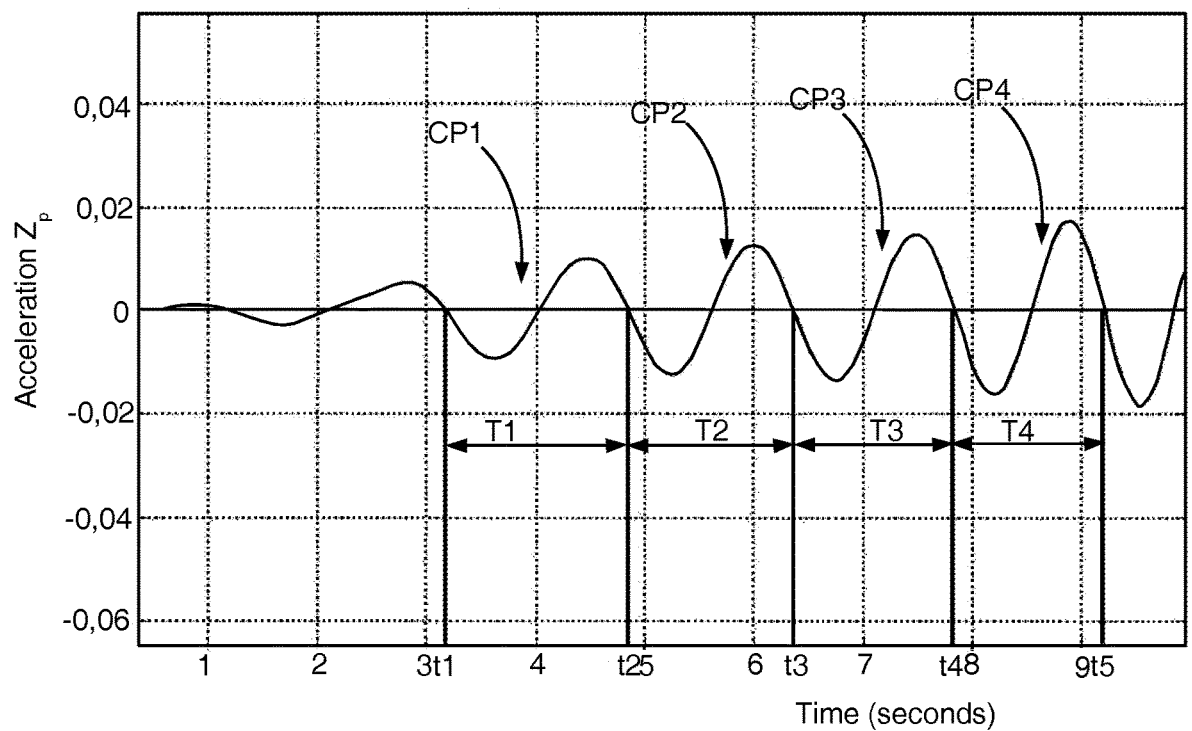
FIG. 5 represents an example of measurement recordings of an acceleration along the axis $z_p$ of the pedal of the pedal set of FIG. 1.

The sensor $C_A$ is an accelerometer, here integrated in the same pedal 1 as the one outfitted with the sensor $C_F$. It makes it possible to measure the acceleration along the axis $z_p$ of the reference system of the pedal 1. During the pedalling, this acceleration oscillates and generally describes a signal of sinusoidal type, as represented in FIG. 5, whose period is directly connected to the pedalling rhythm, in other words, to the angular velocity of the pedal set 4 (i.e., of the cranks 2). This acceleration signal may differ from a sinusoidal signal when the inclination of the pedal 1 varies in the course of a cycle. However, it remains overall periodical, with two changes of slope per period. The measurement of the acceleration with the aid of the sensor $C_A$ thus makes it possible to determine the pedalling rhythm.

As a variant, the sensor $C_A$ may be positioned elsewhere than the pedal, its position being in any case adapted so that it experiences rotations due to the pedalling and so that the measurement of the acceleration by the sensor $C_A$ makes it possible to determine the pedalling frequency. For example, the sensor $C_A$ is arranged in the crank 2 on which is mounted the pedal 1 comprising the sensor $C_F$. In this case, the acceleration is measured along the axis $z_m$ of the reference system of the crank 2. As previously, the measurement of the acceleration with the aid of the sensor $C_A$ makes it possible to determine the pedalling rhythm.

In the exemplary embodiment described here, only one of the two pedals 1 is outfitted with a sensor $C_F$ and with a sensor $C_A$ and it is assumed that, during one complete pedalling revolution or cycle, the effort exerted on one of the pedals during the first half-revolution of pedalling is analogous to that exerted on the other pedal during the second half-revolution of pedalling. As a variant, as previously mentioned, each pedal 1 could be outfitted with a pair of sensors $C_F$ and $C_A$. This can also make it possible to analyse the pedalling movement of an athlete in order to detect any imbalance in this movement.

A communication link, such as a wireless link, is provided between each sensor $C_A$ and $C_F$ and the control unit 5. For this purpose, the control unit 5, the sensor $C_A$ and the sensor $C_F$ each contain a wireless communication module (only the communication module 58 of the control unit 5 being shown in FIG. 7). This link allows the control unit 5 to check the functioning of the sensors $C_A$ and $C_F$ and to ensure the transmission of the data measured by the sensors $C_A$ and $C_F$ to the unit 5. The link could be a wired link.

The module 50 for determination of a maximum of the normal bearing force measured during a pedalling cycle, or revolution, comprises a memory for storing of data on the normal bearing force $Fp_n$ measured during a complete pedalling cycle. It is adapted to analyse these measured data and to determine, among the totality of the data measured in the course of a pedalling cycle, the maximum measured value of the normal bearing force $Fp_n$ on the pedal 1.

The memory 51 stores a correlation function between the mean useful effort (that is, the force $Fm_n$) provided by a cyclist during a pedalling cycle, or revolution, and the maximum of the normal bearing force $Fp_n$ during this cycle. In the exemplary embodiment described here, this correlation function is an affine linear regression function of type $y=\alpha \cdot x+\beta$, which can be represented by a straight line D such as that of FIG. 6. This affine function connects the maximum, or extremum, of the normal bearing force $Fp_n$ on the pedal, denoted max($Fp_n$), during a pedalling cycle, represented on the x-axis, and the mean effective force $\overline{Fm_n}$ (or mean useful effort) provided by the cyclist during this pedalling cycle, represented on the y-axis, by the relation:

$$\overline{Fm_n} = \alpha \cdot \max(Fp_n) + \beta$$

where $\alpha$ and $\beta$ are parameters which are predefined during a calibration phase.

The force sensor $C_F$, the module 50 for determination of the extremum of the normal bearing force on the pedal max($Fp_n$) during a cycle, the memory 51 for storing the affine linear regression function and the estimator 53 for calculating an estimation of the mean useful effort exerted by the cyclist during a pedalling cycle are elements of a device 6 for estimation of the useful effort provided by the cyclist.

The power calculator 54 is designed to calculate the mean useful power developed by the cyclist during a pedalling cycle $CP_j$, this power being denoted $\overline{P}_u[CP_j]$, from the mean useful effort estimated for said cycle $CP_j$, denoted $\overline{Fm}_n[CP_j]$, and from the pedalling rhythm δj determined for said cycle $CP_j$, as shall be described further below in more detailed fashion in the description of the method. It is connected to the module 52 for determination of the pedalling rhythm and to the estimator of effort 53.

The control unit 5 can also comprise one or more test modules designed to detect usage behaviours of the bicycle which do not permit a reliable estimation of the useful effort provided by the cyclist to be made. If one of these tests detects such a behaviour, the useful power is not calculated.

A first test module 55 is designed to check to see if the estimated pedalling rhythm is between 0.5 Hz and 2 Hz, the calculator 54 being adapted to inhibit the calculating of the mean useful power during the pedalling cycle $CP_j$ in event of a negative test, that is, in event of detecting a pedalling rhythm less than 0.5 Hz or greater than 2 Hz. This test module 55 may be connected directly to the module for detecting the pedalling rhythm and inhibit the calculating of rhythm in event of a negative test.

A second test module 56 is designed to detect variations in the acceleration between a value equal to or close to +1 g and a value equal to or close to −1 g, the calculator 54 being adapted to inhibit the calculating of the mean useful power during the pedalling cycle $CP_j$ in event of a positive test, that is, in event of detecting such variations. This test module 56 may be connected directly to the module for detecting the pedalling rhythm and inhibit the calculating of rhythm if the test is positive.

A third test module 57 is designed to detect whether the measured acceleration is contained in a predefined template, stored in memory, the calculator 54 being adapted to inhibit the calculating of the mean useful power during the pedalling cycle $CP_j$ in event of a negative test.

One could define a fourth test module, which checks the relation between the acceleration and the pedalling frequency. In fact, these two quantities are proportional during a normal pedalling cycle. The test would involve making sure that this relation remains within a predefined range.

One could also insert a filtering function for the rhythm and the calculated power.

The affine linear regression function is determined during a preliminary calibration step Ea During this calibration, a number of measurements are taken:
of said force $Fp_n$ normal to the pedal 1 and
of the corresponding useful effort, in other words, the force $Fm_n$ orthogonal to the crank 2.

These measurements are performed on a pedal set outfitting a reference bicycle. The pedal set is outfitted with a device for measuring the useful effort, such as the "Powerforce System" measurement device manufactured by the Radlabor company, allowing a direct measuring of the useful effort exerted by the cyclist during the pedalling. This measurement device is installed between the pedal and the crank and makes it possible to measure the useful force $Fm_n$ and the radial force $Fm_r$, exerted on the crank, with a sampling rate of 1 kHz. The measurement of the useful force is done on the two pedals, right and left, at the same time, and transmitted by radio to a base station connected to a computer. The "Powerforce System" measurement device also enables a measuring of the pedalling rhythm and the useful power developed by the cyclist.

During the calibration step, the reference bicycle is instrumented with the aid of the "Powerforce System" measurement device. One then performs a set of measurements with a varied population of cyclists and sweeping across the largest possible range of useful powers. The measured data are recorded and then processed. The processing consists in discarding inconsistent values of effort from the test, such as those differing by at least 20% from the average of the values during the entire acquisition. After this processing, the measured values—that is, the values of the efforts measured by the pedal and the useful effort measured by the referent "Powerforce System" measurement device—are resampled in a pedalling cycle. The resampling makes it possible to study and compare two different systems in a pedalling cycle, using different sampling rates, independently of the pedalling rhythm. From these resampled values, one determines a set of data pairs, each one comprising the maximum of the force normal to the pedal, $\max(Fp_n)$, during a pedalling cycle, and the mean force $Fm_n$ (or mean useful effort), $\overline{Fm}_n$, provided by a cyclist during the pedalling cycle. These data pairs ($\max(Fp_n)$, $\overline{Fm}_n$) constitute a set of points, as represented by crosses in FIG. 6. From this set of points, one constructs an affine function $f_{aff}$ of the form y=αx+β, represented by the straight line D in FIG. 6, by linear regression, for example, with the aid of the MATLAB® tool. One thus seeks to model the relations between the data $\max(Fp_n)$, corresponding to the variable x, and $\overline{Fm}_n$, corresponding to the variable y, with the aid of an affine function of the form y=αx+β. The goal is to find the parameters α and β enabling an optimal fitting of the pairs (x,y), that is, ($\max(Fp_n)$, $\overline{Fm}_n$), to the affine function. At the conclusion of the calibration step E0, the affine correlation function between $\max(Fp_n)$ and $\overline{Fm}_n$, and especially the optimal parameters α and β determined, are stored in the memory 51.

The affine function $f_{aff}$ thus determined from a reference bicycle instrumented with the "Powerforce System" measurement device can be used by systems for power estimation according to the invention outfitting a group of bicycles which are similar or belong to the same category of bicycle (racing bike, mountain bike, or hybrid bike) as the reference bicycle. In fact, by performing the calibration step on a reference bicycle of the same type, such as a bicycle of mountain bike, hybrid bike, or road bike or racing bike type, as the bicycle intended to be outfitted with the power estimation system described here, one optimizes the fitting of the pairs (x,y), that is, ($\max(Fp_n)$, $\overline{Fm}_n$), to the correlation function. This advantageously allows one to obtain a more precise value for the mean useful effort.

As a variant, for example in the case where the power estimation system is going to outfit the bicycle of a high-level athlete, the calibration step could be done directly with this bicycle and this athlete alone. The correlation function so obtained is then stored in the memory 51, for example by using communication means of the control unit. When this high-level athlete uses their bicycle outfitted with the power estimation system so calibrated, the value of the mean useful effort obtained is more precise.

Even though we have described here a case where the correlation function is an affine linear regression function of type y=α·x+β, it will be understood that one can use other correlation functions, such as a 2nd or higher degree polynomial. Moreover, the more the correlation function used optimizes the fitting of the pairs (x,y), that is, ($\max(Fp_n)$, $\overline{Fm}_n$), to the correlation function, the more precise will be the value of the mean useful effort determined. Such an optimization of the fit is more particularly interesting in the case of a high-level athlete for whom the most precise possible measurement of the mean useful effort is desired.

Figure 7:
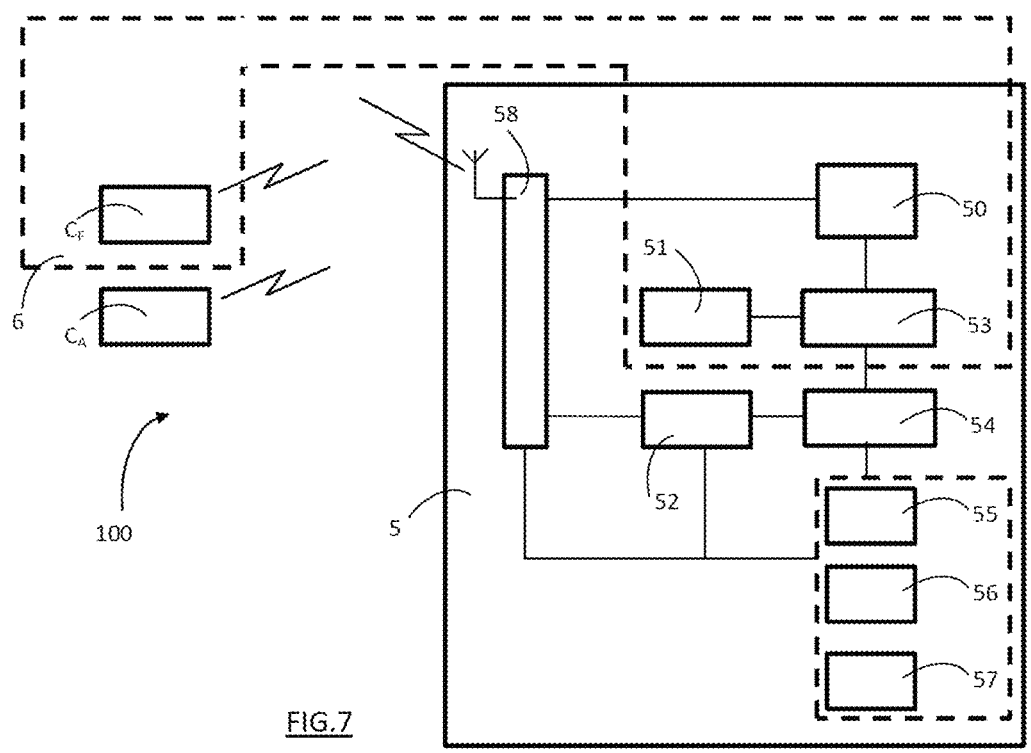
FIG. 7 represents a functional block diagram of a system for estimation of the useful power developed by a cyclist during the pedalling.
Figure 8:
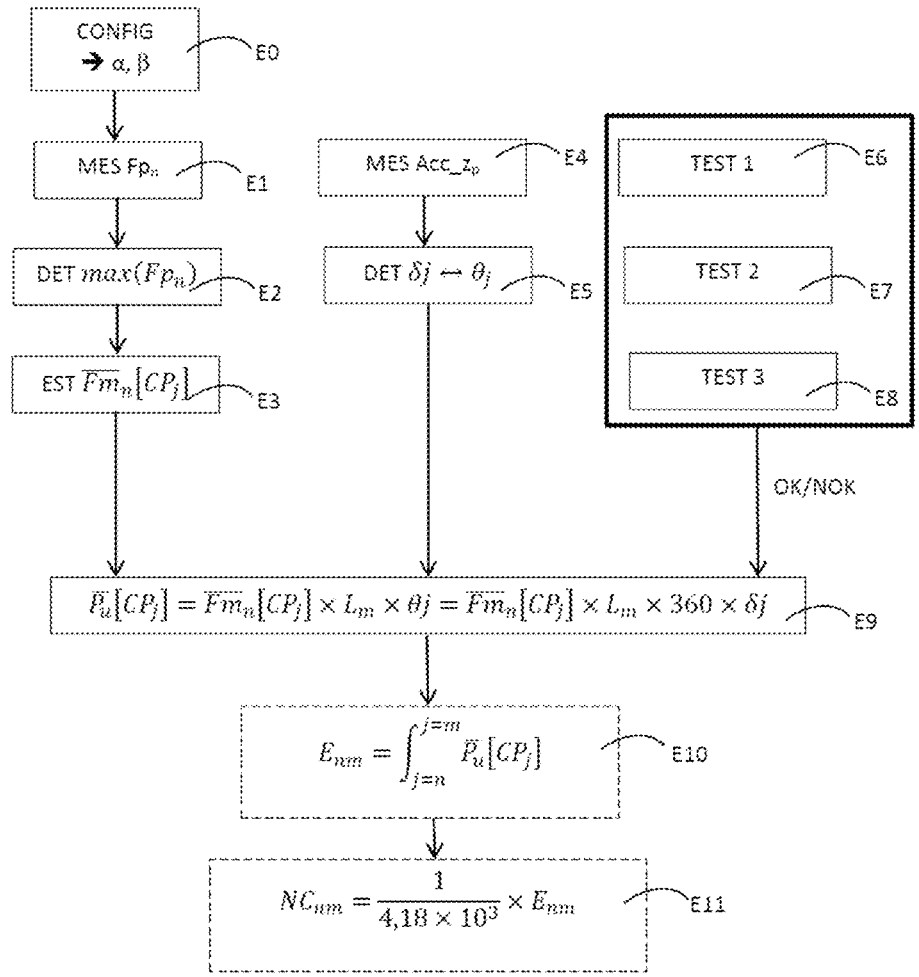
FIG. 8 represents a flow chart of the steps in the method of estimation of the useful power developed by a cyclist during the pedalling.

We shall now describe the method of estimation of a mean useful effort provided by a cyclist in the course of pedalling on the bicycle outfitted with the pedal set 4, according to one particular embodiment of the invention, making reference to FIG. 7.

The method of estimation of the useful effort involves a step E1 of measurement of the bearing force $Fp_n$ exerted by the cyclist orthogonally to the instrumented pedal 1. The measurements are done by the pressure sensor $C_F$ with a sampling rate equal for example to 100 Hz. The measured data are transmitted to the central device 5.

The measurement step E1 is followed by a step E2 of processing of the measured data, during which the control unit 5 determines the maximum value $\max(Fp_n)$ of the normal bearing force measured during a pedalling cycle $CP_j$, from data measured in the pedalling cycle $CP_j$.

Figure 6:
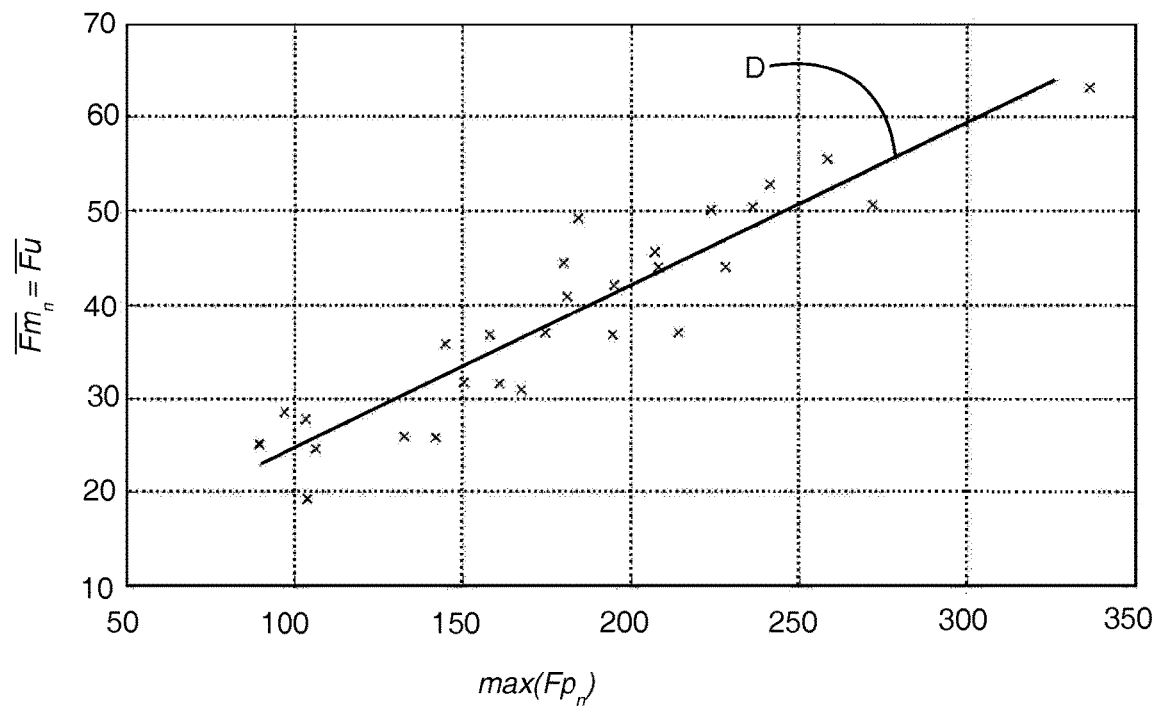
FIG. 6 represents a straight linear regression line in a reference system comprising the mean useful or effective force in a pedalling cycle along the y-axis and the extremum of the bearing force orthogonal to the pedal in the pedalling cycle along the x-axis.

The method then includes a step E3 of estimation of the mean useful effort exerted by the cyclist during the pedalling cycle $CP_j$ from the maximum value $\max(Fp_n)$ of the force measured in this cycle $CP_j$ and with the aid of the predetermined affine correlation function $f_{\mathit{aff}}$ between the mean useful effort $\overline{Fm}_n$ in a cycle and the maximum of the force during this cycle $\max(Fp_n)$. One denotes as $\overline{F_u}[CP_j]$ the mean useful effort in the pedalling cycle $CP_j$. Referring to FIG. 6, one thus determines the mean useful effort $\overline{Fm}_n$ for the cycle $CP_j$ that corresponds to the maximum value $\max(Fp_n)$ of the force measured in this cycle $CP_j$ by the affine function $y=\alpha x+\beta$ (or by the straight linear regression line D of FIG. 6). In other words, one seeks to determine the value of y corresponding to the mean useful effort $\overline{Fm}_n$ in the cycle $CP_j$, from the value x equal to $\max(Fp_n)$ for this cycle $CP_j$ by the relation $y=\alpha x+\beta$. This step E3 is carried out by the estimator 53 of the control unit 5.

We shall now describe the method of estimation of the useful power developed by the cyclist in the course of pedalling on the bicycle outfitted with the pedal set 4, according to one particular embodiment of the invention. It makes it possible to estimate the mean useful power provided by the cyclist in a current pedalling cycle, denoted as $CP_j$ (with $j=1, 2, \ldots$). We denote as $\overline{P_u}[CP_j]$ the mean useful power for the cycle $CP_j$.

The estimation of the useful power $\overline{P_u}[CP_j]$ involves an estimation of the mean useful effort $\overline{F_u}[CP_j]$ exerted by the cyclist during a current pedalling cycle $CP_j$. This mean useful effort $\overline{F_u}[CP_j]$ corresponds to the mean tangential (or orthogonal) force transmitted to the crank 2, denoted as $\overline{Fm}_n[CP_j]$, during the pedalling cycle $CP_j$. This estimation is done by carrying out the method of estimation just described, involving steps E1 to E3.

The method furthermore involves a step E4 of measuring the acceleration of the pedal 1 along the axis $z_p$ of the reference system of the pedal 1, with the aid of the sensor $C_A$. This measurement step is done during N successive pedalling cycles, one of which, such as the Nth cycle, is the current pedalling cycle $CP_j$ for which one wishes to estimate the useful power developed by the cyclist.

The measurement step E4 is followed by a step E5 of estimation of the current pedalling rhythm, valid during the pedalling cycle $CP_j$. The pedalling rhythm corresponds to the number of pedalling cycles per unit of time. The estimation of the pedalling rhythm is done from measurements of acceleration. The acceleration signal is generally of sinusoidal type, as represented in FIG. 5, and in any case it is periodical. We note as Ti the duration of a period of the acceleration signal, that is, the interval of time between two similar consecutive points of the signal. The period Ti corresponds to the duration of the pedalling cycle $CP_i$. In order to estimate the pedalling rhythm valid during the cycle $CP_j$, the control unit 5 calculates here a mean period $\overline{T_j}$ of the acceleration signal from measured periods for the N cycles $CP_{j-N+1}$ to $CP_j$ by the following relation:

$$\overline{T_j} = \frac{1}{N} * \sum_{i=j-N+1}^{i=j} T_i$$

Although in the above formula a division by the number N of cycles is performed, one can also omit this division in order to decrease the complexity of calculation and thus reduce the calculation time. This latter case is particularly advantageous when the calculation is done by a microcontroller whose calculating resources are limited.

We note that, in FIG. 5, the acceleration signal is centred at zero on the y-axis. Now, in practice, depending on the face of the pedal used as the bearing face of the cyclist's foot, the acceleration is either centred around +1 g or around −1 g, where 1 g represents the acceleration of gravity at the surface of the earth (the standard acceleration of gravity being 9.80665 m·s$^{-2}$). In order to centre the acceleration signal around zero, various solutions may be contemplated. In the embodiment described here, the solution consists in subtracting from the measured acceleration signal its mean value obtained by a recursive low-pass filtering with a low sampling rate, for example, on the order of 0.1 Hz.

The control unit 5 then calculates the pedalling rhythm $\delta j$ valid for the cycle $CP_j$ by the relation:

$$\delta j = \frac{1}{\overline{T_j}}$$

The pedalling rhythm $\delta j$ is expressed in Hertz. It may be converted into angular velocity $\dot{\theta}_j$, expressed for example in radians per second, by the relation:

$$\dot{\theta}_j = 2\pi \times \delta j$$

In the embodiment described here, the method involves a first test step E6 designed to detect a variation in the acceleration between two values equal to or substantially equal to +1 g and −1 g, respectively, (g representing the unit of measurement of the acceleration). Depending on the direction of the faces of the pedal during the pedalling, the measured acceleration signal either varies about +1 g or about −1 g. If one detects an acceleration signal varying from a value equal to or close to +1 g to a value equal to or close to −1 g or from a value equal to or close to −1 g to a value equal to or close to +1 g, this indicates untimely changes of face of the pedal. We note that by "close to +1 g" and "close to −1 g" is meant here "between 0.8 g and 1 g" and "between −1 g and −0.8 g", respectively.

In event of a positive test E6, or otherwise stated, in event of detection of untimely changes of face of the pedal, the calculating of the mean useful power for the cycle $CP_j$ is inhibited (that is, blocked or interrupted).

The method here involves a second test step E7 consisting in checking to see whether the estimated rhythm is within a range of predetermined possible values, in the present case, [0.5 Hz; 2 Hz]. The limits of this range, namely, 0.5 Hz and 2 Hz, correspond to the minimum possible pedalling rhythm, below which the bicycle is no longer be held in balance, and the maximum pedalling rhythm which a cyclist can attain based on physiological parameters.

If the test E7 is negative, the estimated rhythm being less than 0.5 Hz or greater than 2 Hz, the calculating of the useful power is inhibited, that is, blocked or interrupted. This makes it possible to eliminate false power estimations, for example, due to the cyclist causing the pedal to turn about its axis A.

If the test E7 is positive, the estimated rhythm being between 0.5 Hz and 2 Hz, the method moves on to the next step.

The method may likewise involve a third test step E8 using an acceleration signal template. This template is based on a relation between the amplitude of the acceleration along $z_p$ and the pedalling rhythm δj. This relation is as follows:

$$a_c = \dot{\theta}_J^2 * L_m,$$

where
$a_c$ is the centripetal acceleration;
$\dot{\theta}_J$ is the speed of rotation;
$L_m$ is the length of the crank.

This acceleration, collinear with the crank, is added to the proper accelerations as seen by the pedal. It makes it possible to construct the template.

The third test step E8 consists in checking to see whether the measured acceleration lies in the template or is outside the template (if it is abnormally low or abnormally high). In event of a positive test (acceleration in the templates), the method moves on to the next step. In the event of a negative test (acceleration outside the template), the calculating of the useful power is inhibited, that is, blocked or interrupted.

The calculation step E9 is designed to calculate the mean useful power developed during the cycle $CP_j$, $\overline{P_u}[CP_j]$, from the mean useful effort estimated for this cycle $CP_j$, $\overline{F_u}[CP_j]$ or $\overline{Fm}_n[CP_j]$, and from the current pedalling rhythm δj determined for this cycle $CP_j$, by the relation:

$$\overline{P_u}[CP_j] = \overline{Fm}_n[CP_j] \times L_m \times \dot{\theta}_J = \overline{Fm}_n[CP_j] \times L_m \times 2\pi \times \delta j$$

where:
$\overline{Fm}_n[CP_j]$ or $\overline{F_u}[CP_j]$ represents the mean useful effort (or force) exerted by a cyclist during the pedalling cycle $CP_j$;
$L_m$ represents the length of the crank 2, expressed in m;
$\dot{\theta}_J$ represents the angular velocity of the pedal set 4 or the crank 2, expressed in radians per second
δj represents the pedalling rhythm expressed in Hz.

The estimation of the useful power done in this way offers a precision on the order of 10%. It is based on measurements which are easy to perform, requiring two sensors $C_F$ and $C_A$ which are cheap and easy to put in place simply on a pedal, and with the aid of easy calculations, requiring little energy resources.

The mean useful power calculated during each pedalling cycle can be displayed on a screen of the control unit 5. Thus, the cyclist can consult it in order to manage their effort.

In the event that the calculating of the mean useful power is inhibited due to one of the previously described tests, the screen can display either a power value of zero or an error message of "error" type, or the previous estimated useful power value.

The useful power so estimated can likewise be used to make an estimation of the calories spent by the cyclist. In order to estimate the amount of calories spent by the cyclist during a period of pedalling, one integrates over time the useful power calculated by the method just described, during a first calculation step E10, then converts into calories energy so calculated during a second calculation step E11. The conversion for example consists in dividing the energy, expressed in joules, and calculated by integration in step E10, by the factor $4.18 \times 10^3$ to obtain a number of calories spent, expressed in kcal (1 calorie equaling 4.18 joules). For this purpose, the control unit 5 could include a calculator (not shown) to perform the integration over time of the useful power calculated and the conversion into calories of the energy thus calculated.

The system 100 for estimation of the useful power developed by the cyclist during the pedalling as just described can outfit an electrically assisted bicycle. The estimated useful power can serve to better manage the electrical assistance to the pedalling. The power level provided by the motor can be regulated so that this mean useful power provided by the cyclist remains equal to a predefined value or remains within a range of predefined values. This or these predefined values of useful power provided by the cyclist can be chosen such as to require a moderate and regular effort from the cyclist during the pedalling, regardless of the level of effort required to propel the bicycle. The cyclist thus provides a moderate and regular effort during the pedalling, even if the electrical consumption of the motor is reduced. The pedalling comfort of the cyclist is improved, since they neither spin the pedals nor pedal too intensively. When the mean useful power for one cycle is not calculated because one of the tests performed detected an anomaly, the assistance of the electric bicycle uses the mean useful power calculated for the previous pedalling cycle with no anomaly detected. The invention thus also concerns an electrically assisted bicycle, comprising an electric motor, an electrical power supply battery, a motor control device, and a system for estimation of a useful power developed by an individual during the pedalling on said bicycle, as previously described, the control device being adapted to control the electric motor as a function of the estimated useful power.

The invention also concerns an electrically assisted bicycle, comprising an electric motor, a power supply battery, a motor control device and a system for estimation of the useful power developed by the cyclist during the pedalling on the bicycle, as previously described, the control device being adapted to control the electric motor as a function of the estimated useful power.

The invention also concerns a motorization kit for a bicycle, comprising a, for example electric or thermal, motor, an electrical power supply battery, a motor control device, and a system for estimation of a useful power developed by an individual during the pedalling on said bicycle, as previously described, the control device being adapted to control the electric motor as a function of the estimated useful power.

Throughout this document, «alternating pedalling movement» is preferably understood to mean a movement in which an individual exerts alternating forces on a first pedal and on a second pedal of a pedal set or of a pedal set device. As a result, the term «alternate movement of rotation of two cranks» or «alternate movement of pedal device», is preferably understood to mean a unidirectional movement of rotation of the cranks or of the pedal set which is the consequence of the actions of the individual who exerts alternating efforts on a first pedal and on a second pedal of the pedal device.

The invention claimed is:

1. A method of estimation of a useful effort provided by an individual during a physical activity comprising executing an alternating pedalling movement on a pedal device, comprising:

measuring a bearing force ($Fp_n$) on a pedal of the pedal device, different from the useful effort, exerted by the individual during a pedalling cycle ($CP_j$), determining a maximum ($\max(Fp_n)$) of the bearing force measured during the pedalling cycle ($CP_j$), and estimating a mean useful effort exerted by the individual during the pedalling cycle ($CP_j$) from the maximum of the bearing force ($\max(Fp_n)$) determined and with the aid of a predetermined correlation function between maximum bearing force during the pedalling cycle and mean useful effort in the pedalling cycle.

2. The method according to claim 1, wherein the predetermined correlation function is an affine linear regression function.

3. The method according to claim 1, wherein the bearing force ($Fp_n$) is measured with the aid of a pressure sensor ($C_F$) outfitting at least the pedal of the pedal device.

4. The method according to claim 1, wherein the useful effort estimated is a tangential component ($Fm_n$) of a force transmitted to a crank of the pedal device by bearing on the pedal.

5. The method according to claim 1, wherein the bearing force measured ($Fp_n$) is the component of a total bearing force ($F_{tot}$) exerted by the individual on the pedal which is orthogonal to a plane of bearing on the pedal.

6. The method according to claim 1, comprising, during a preliminary calibration, determining the correlation function from a set of measurements of the bearing force and measurements of the corresponding useful effort.

7. The method according to claim 1, comprising:
estimating the mean useful effort ($\overline{F_u}[CP_j]$) exerted by the individual during the current pedalling cycle ($CP_j$), by implementing the measuring, determining and estimating, and further comprising:

measuring an acceleration of the pedal device during a succession of pedalling cycles, determining a pedalling rhythm valid for the current pedalling cycle ($CP_j$) from the measurements of acceleration, and calculating a mean useful power ($\overline{P_u}[CP_j]$) developed during the current pedalling cycle ($CP_j$) from the mean useful effort estimated for the current pedalling cycle ($CP_j$) and the estimated pedalling rhythm valid for the current pedalling cycle ($CP_j$).

8. The method according to claim 7, comprising, during the calculating of the mean useful power ($\overline{P_u}[CP_j]$), calculating a product of the mean useful effort ($\overline{F_u}[CP_j]$) estimated during the current pedalling cycle ($CP_j$), a current angular velocity ($\theta j$) and the length ($L_m$) of a crank of the pedal device, the angular velocity ($\theta j$) being a function of the estimated pedalling rhythm ($\delta j$) valid for the current pedalling cycle ($CP_j$).

9. The method according to claim 7, comprising performing a test by checking to see if the estimated pedalling rhythm ($\delta j$) is between 0.5 Hz and 2 Hz, wherein the calculating of the mean useful power ($\overline{P_u}[CP_j]$) during the pedalling cycle ($CP_j$) is inhibited in the event of a negative test.

10. The method according to claim 7, comprising performing a test designed to detect variations in the acceleration from a value equal to or close to +1 g to a value equal to or close to −1 g and from a value equal to or close to −1 g to a value equal to or close to +1 g, wherein the calculating of the mean useful power for the current pedalling cycle ($CP_j$) is inhibited in the event of a positive test.

11. The method according to claim 7, comprising performing a test designed to detect whether the measured acceleration is contained in a predefined template, wherein, in the event of a negative test, the calculating of the mean useful power for the current pedalling cycle ($CP_j$) is inhibited.

12. A method of estimation of an amount of calories spent by an individual during a physical activity comprising executing an alternating pedalling movement on a pedal device, comprising:
performing the method according to claim 7,
integrating over time an estimated power in order to calculate an estimation of an energy spent, and
converting the estimated energy spent into calories.

13. A device for estimation of a useful effort provided by an individual during a physical activity consisting in executing an alternating pedalling movement on a pedal device, comprising:
a sensor ($C_F$) to measure a bearing force ($Fp_n$) on a pedal of the pedal device, different from the useful effort, exerted by the individual during a pedalling cycle ($CP_j$),
a module for determination of a maximum of the bearing force ($\max(Fp_n)$) measured during the current pedalling cycle, and
an estimator of useful effort designed to estimate a mean useful effort ($\overline{F_u}[CP_j]$) exerted by the individual during the current pedalling cycle ($CP_j$) from the maximum of the bearing force ($\max(Fp_n)$) determined and with the aid of a predetermined correlation function between the maximum of the bearing force exerted during the pedalling cycle and the mean useful effort in the pedalling cycle.

14. The device according to claim 13, wherein the bearing force is measured with the aid of a pressure sensor ($C_F$) outfitting at least the pedal of the pedal set.

15. The device according to claim 13, comprising a memory for storing the correlation function, wherein the correlation function is an affine linear regression function.

16. A system for estimation of a useful power developed by an individual during a physical activity comprising executing an alternating pedalling movement on a pedal device, the system comprising:
the device for estimation of the mean useful effort exerted by the individual during the pedalling cycle $CP_j$ according to claim 13,
a sensor ($C_A$) to measure an acceleration of the pedal device during a succession of pedalling cycles,
a module for determination of a pedalling rhythm ($\delta j$) valid for the current pedalling cycle ($CP_j$), from the measurements of acceleration, and
a calculator of useful power designed to calculate the mean useful power developed during the pedalling cycle, from the mean useful effort estimated for the pedalling cycle ($CP_j$) and from the valid pedalling rhythm determined for the pedalling cycle ($CP_j$).

17. The system according to claim 16, wherein the sensor to measure the acceleration ($C_A$) is disposed in or on the pedal of the pedal device.

18. The system according to claim 16, comprising a control unit, integrating the estimator of useful effort and the calculator of useful power, adapted to communicate by wireless link with the force sensor ($C_F$) and with the acceleration sensor ($C_A$) outfitting the pedal of the pedal device.

19. The system according to claim 16, wherein the calculator of useful power is adapted to calculate the product of the mean useful effort estimated for the pedalling cycle ($CP_j$), an angular velocity ($\theta j$) of the pedal set valid for the pedalling cycle ($CP_j$) and the length ($L_m$) of a crank of the pedal set, the angular velocity ($\theta j$) being a function of the pedalling rhythm ($\delta j$) determined.

20. The system according to claim 16, comprising a first test module designed for checking to see if the estimated pedalling rhythm is between 0.5 Hz and 2 Hz, the power calculator being adapted to inhibit the calculating of the useful power in the event of a negative test.

21. The system according to claim 16, comprising a second test module designed to detect variations in the acceleration between a value equal to or close to +1 g and a value equal to or close to −1 g, the power calculator being adapted to inhibit the calculating of the useful power in the event of a positive test.

22. The system according to claim 16, comprising a third test module designed to detect whether the measured acceleration is contained in a predefined template, the power calculator being adapted to inhibit the calculating of the useful power in event of a negative test.

23. An electrically assisted bicycle, comprising:
an electric motor,
a power supply battery,
a motor control device, and
the system for estimation of a useful power developed by an individual during the pedalling on the bicycle according to claim 16,
wherein the control device is adapted to control the electric motor as a function of the estimated useful power.

24. A motorization kit for a bicycle, comprising:
an electric or thermal motor,
a power supply battery,
a motor control device, and
the system for estimation of a useful power developed by an individual during the pedalling on the bicycle according to claim 16,
wherein the control device is adapted to control the motor as a function of the estimated useful power.

* * * * *